Figure 3:
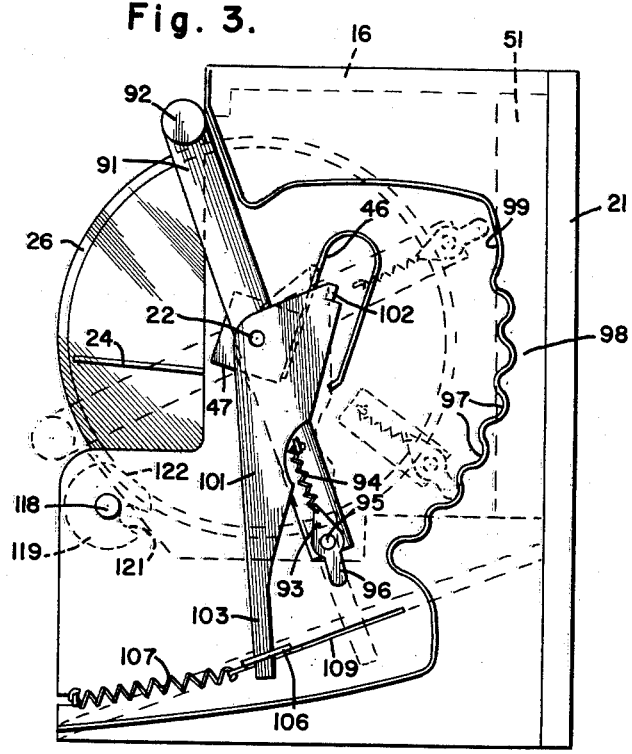

April 2, 1963 G. A. WISWELL 3,083,867
COIN-ACTUATED VENDING MACHINE
Filed Aug. 7, 1959 3 Sheets-Sheet 1

INVENTOR.
Grant A. Wiswell

April 2, 1963          G. A. WISWELL          3,083,867

COIN-ACTUATED VENDING MACHINE

Filed Aug. 7, 1959          3 Sheets-Sheet 2

INVENTOR.
Grant A. Wiswell
BY
*Julian Caplan*
*Attorney*

April 2, 1963   G. A. WISWELL   3,083,867
COIN-ACTUATED VENDING MACHINE
Filed Aug. 7, 1959   3 Sheets-Sheet 3

INVENTOR.
Grant A. Wiswell
BY
Julian Caplan
attorney

United States Patent Office 3,083,867
Patented Apr. 2, 1963

3,083,867
COIN-ACTUATED VENDING MACHINE
Grant A. Wiswell, 812 Jefferson Court, San Mateo, Calif.
Filed Aug. 7, 1959, Ser. No. 832,288
7 Claims. (Cl. 221—122)

This invention relates to a new and improved coin-actuated vending machine and more particularly to that type of vending whereby the purchaser may select one of several varieties of merchandise. The machine is intended for use particularly with merchandise coming in relatively small, uniformly shaped packages such as fiber tubes approximately 3 inches in length and ⅜ inch in diameter.

The vending machine which is the subject of this invention provides a compartmented drum rotatable about a horizontal axis and enclosed behind a transparent casing through which merchandise in the various compartments may be visually observed. On one side of the machine is a manually-actuated lever which indexes the rotatable drum so that the selected compartment may be advanced to dispensing position. On the other side of the machine is a manually-actuated lever which, after a coin has been deposited in the machine, functions to dispense one item of merchandise from the pre-selected compartment in the drum.

The principal advantage of the present invention is its simple construction with very few moving parts all compactly arranged, so that the device occupies a very small amount of space in a location such as the counter of a restaurant or similar location where purchasers are likely to purchase on impulse.

Another feature of the invention is the fact that its compact arrangement and the positioning of the movable parts are such that the total width of the machine is only slightly greater than the length of the tube or other item being vended.

Another feature of the invention is the provision of means which accurately positions the selected drum compartment in alignment with the opening through which the merchandise is dispensed and insures that an item of merchandise will drop from the compartment, if any remains therein. In addition, the machine provides additional mechanism which receives a single tube from its compartment and positively insures discharge of that tube and no additional tube through the discharge chute.

Still another feature of the invention is the provision of means which prevents more than one item being discharged upon deposit of a single coin.

A still further feature of the invention is the provision of a means which insures that once the vending lever has been depressed it must be moved through a full stroke before an additional coin can be accepted.

Other objects of the present invention will become apparent upon reading the following specification, and referring to the accompanying drawings in which similar characters of reference represent corresponding parts in each of the several views.

Figure 1:
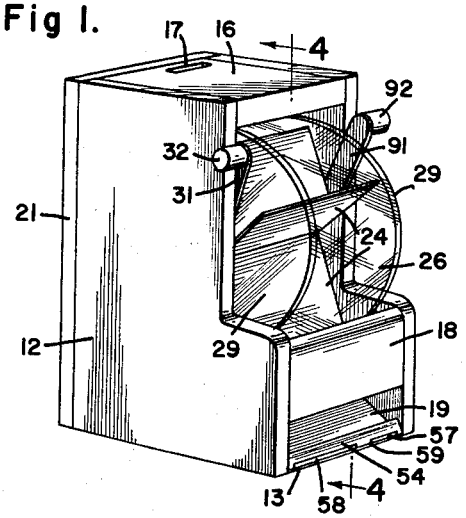
Figure 7:
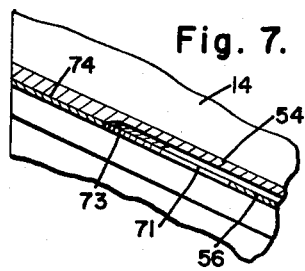
Figure 2:
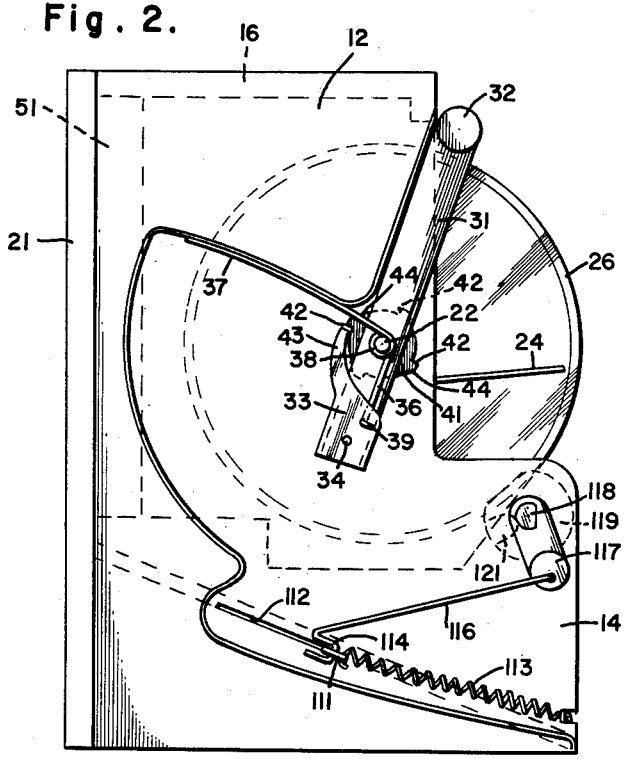
Figure 6:
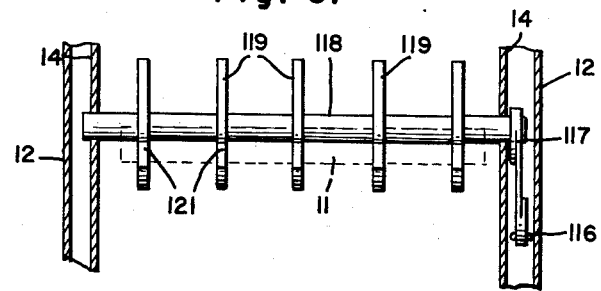
Figure 4:
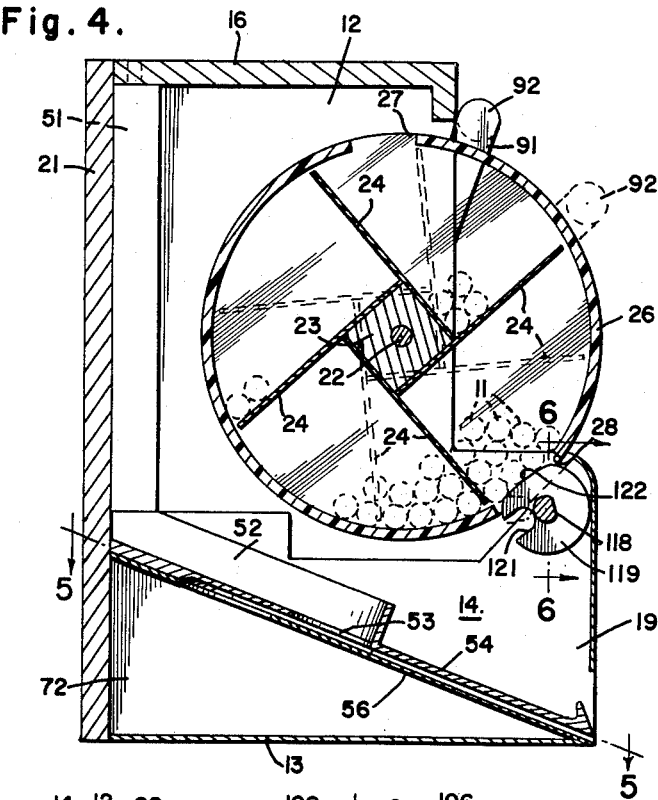
Figure 5:
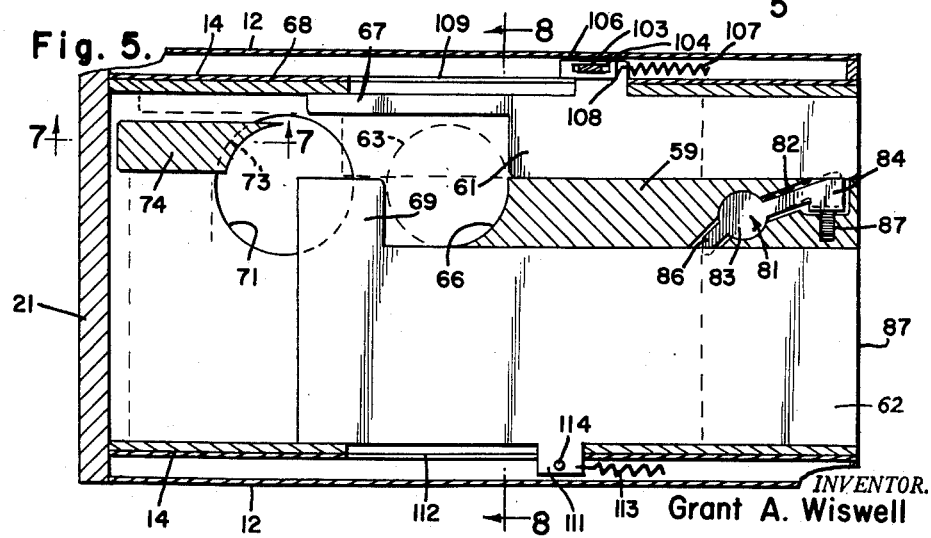

In the drawings:

FIG. 1 is a perspective view of the machine.
FIG. 2 is a side elevational view of the machine as viewed from the left in FIG. 1, with the left-hand outer side plate removed.
FIG. 3 is a view similar to FIG. 2 as viewed from the right.
FIG. 4 is a vertical sectional view taken substantially along line 4—4 of FIG. 1.
FIG. 5 is an enlarged sectional view taken substantially along line 5—5 of FIG. 4.
FIG. 6 is a fragmentary view taken substantially along line 6—6 of FIG. 4.
FIG. 7 is a fragmentary sectional view taken substantially along line 7—7 of FIG. 5.

Figure 8:
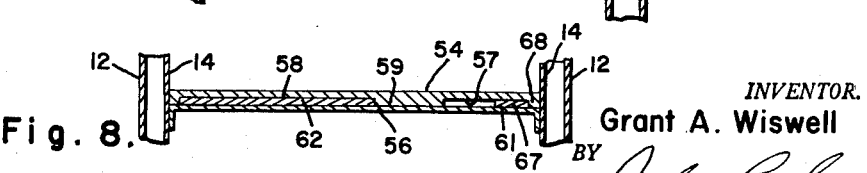

FIG. 8 is a fragmentary transverse section taken substantially along line 8—8 of FIG. 5.

The present invention comprises a vending machine of the type to dispense cylindrical or similar regularly shaped, small objects such as fiber tubes 11 containing merchandise such as perfume vials and which are characterized by a relatively narrow diameter or width as compared with the length of the tube. The overall width of the machine is only slightly more than the length of the tubes 11.

The vending mechanism is container within side plates 12 positioned on either side of the machine and interconnected by base 13 which has upstanding side pieces 14 fastened to the inside surfaces of side plates 12. Top 16 is provided with a coin slot 17. Front 18 has a vending opening 19 and the rear of the machine is closed by a back 21. A transverse horizontal shaft 22 passes across the machine forwardly of the center and provides an axis for the rotation of square spindle 23. Four spindle blades 24 are fixed tangentially to spindle 23. It will be understood that more or fewer blades 24 may be used depending upon the number of different varieties of tubes 11 desired, but four blades are illustrated herein and hereinafter described. A cylindrical casing 26 having a center of curvature concentric with shaft 22 surrounds blades 24 and is provided with a top opening 27 and a bottom opening 28. Cylinders 11 are dispensed through opening 28 and new merchandise loaded through opening 27 when cover 16 has been removed. Casing 26 extends across almost the entire distance between the side plates 12 and is provided with circular ends 29 at either end which are fixed to side plates 12 with thin gaps therebetween. Casing 26 and blades 24 define a compartmented drum having four compartments each of which may be stocked with a particular type of merchandise which may be selected by the purchaser as hereinafter explained.

The selection of the particular compartment from which a purchase is to be made is controlled by selector lever 31 located on the left-hand side of the machine, as viewed from the front. Selector lever 31 is pivoted about the left-hand end of shaft 22 and is positioned for pivotal movement in a vertical plane between left side plate 12 and end 29. The outer end of selector lever 31 is provided with a knob 32 which may be conveniently grasped by the purchaser. The inner end of lever 31 carries a pawl 33 pivoted thereto by means of pivot 34. Lever 31 is biased to upward position by means of spring 36, one end 37 of which is held against side plate 12, and the middle portion 38 of which is wrapped around shaft 22 and the opposite end of which is formed with a hook 39 which passes through a hole in pawl 33. Thus, spring 36 performs the dual function of returning selector lever 31 to upper position when it is released by the purchaser, and also biases pawl 33 in a clockwise direction about pivot 34, as viewed in FIG. 2. The left-hand end of spindle 23 carries ratchet wheel 41 having four teeth 42 corresponding to the four merchandise compartments. When the selector lever 31 is depressed the end 43 of pawl 33 engages the radial flank of one of the teeth 42 and advances or indexes the spindle 90° in a clockwise direction, as viewed in FIG. 2. When the selector lever 31 is released it returns to upper position under the action of spring 36 and, by reason of the curved flank 44 of the tooth, the pawl 36 pivots out of position to prevent reverse rotation until the end of pawl clears the radial flank whereupon the spring 36 returns pawl end 43 into contact therewith. To secure precise location of the blades 24 relative to the bottom opening 28, a second spring 46 is preferably located in the cavity between the right-hand plate 12 and the right-hand end 29. Spring 46 has a flat portion which bears against a square cam 47 on the right-hand end of the spindle 23. Thus, the force of spring 46 tends to locate cam 47 in precise alignment so that one of the blades 24 is positioned at the exact point relative to bottom opening 28 which makes vending of cylinders most effective.

A conventional slug rejector 51 commercially available and well understood in the vending machine art is located at the rear of the machine and receives coins deposited in slot 17. Bogus coins are rejected through opening 19 in the front of the machine. Good coins pass downwardly through downwardly-forwardly slanted chute 52 and fall through hole 53 in downwardly-forwardly inclined plate 54, which constitutes the bottom of chute 52 and extends across the width of and to the front of the machine. Below plate 54 is a bottom plate 56 parallel thereto and spaced downwardly therefrom. Two grooves 57 and 58 are formed in the underside of plate 54, there being a downwardly projecting divider 59 left between the two grooves. Slidable in the right-hand groove 57 is a first slide 61. Slidable in the second groove 58 is a second slide 62. The two slides 61 and 62 are independent of each other until a coin falls down through hole 53 into a position indicated by dotted circle 63. To accommodate a coin in position 63, divider 59 is formed with an arcuate cut-out 66 at its inner end; slide 61 is formed with a notch in its inner central portion leaving a rearwardly projecting guide finger 67 which slides against the downwardly extending side edge 68 of plate 65; and slide 62 is formed with an inward lateral extension 69 on its inner end. When there is no coin in the position indicated by reference numeral 63, movement of first slide 61 does not result in any movement of second slide 62 and, hence, the machine will not deliver merchandise until a good coin has passed the slug rejector 51 and dropped into position between the two slides. Thereupon, movement of first slide 61 (by means which is hereinafter described) moves the good coin to the left, as viewed in FIG. 5 until it registers with opening 71 in bottom plate 56, whereupon the coin drops into the space 72 below bottom plate 56 and above bottom 13 which constitutes the coin box of the machine. In order to forceably eject the coin through hole 71, a cam surface 73 is formed on the edge of a downward projection 74 of plate 54 at the back end thereof. Cam surface 73 is curved and slanted in two planes as illustrated to merge with a segment of hole 71 and functions to kick the coin forceably downwardly into the coin box 72 and hence prevent the machine from jamming in the event that the accumulation of coins in the coin box would otherwise impede dropping of the coins. Movement of the coin toward hole 71 pushes against extension 69 and hence moves slide 62 in the same direction as slide 61.

To provide a time delay in the retro-reciprocal action of slide 62, member 81 is placed in a recess 82 in divider strip 59 between the two slides 61 and 62. Member 81 has a round pivot portion 83 and first and second detents 84 and 86. Member 81 is biased in a counterclockwise direction, as viewed in FIG. 5, by spring 87 located in divider 59. When slide 62 moves toward (to the left as viewed in FIG. 5), second detent 86 engages behind the bottom end 87 of second slide 62 and holds it elevated so that it cannot return to down position until first slide 61 has returned to downward position and depressed second detent 84 against the force of spring 87. Since the second slide 62 controls the vending of merchandise, the prior return of the first slide 61 insures that only one article will be vended for each coin received.

Movement of the first slide 61 is controlled by the vending lever 91 located on the right-hand side of the machine as viewed from the front. The vending lever 91 is located between the right-hand side plate 12 and the right end 29 and pivots about shaft 22 in a vertical plane. Finger grip 92 is located on the outer end and is gripped by the operator. Vending lever 91 carries on its inner end a pawl 93 pivoted thereto by pin 95 and is biased to a position parallel to lever 91 by means of spring 94. The point 96 on the inner end of pawl 93 engages notches 97 formed in a boss 98 on right-hand side plate 12. Above the teeth 97 the boss 98 opens outwardly in recess 99. The function of pawl 93 and teeth 97 is to insure that the vending lever 91 is pivoted through its complete stroke once the stroke has been initiated thus preventing jackpotting of the machine. As the purchaser depresses grip 92 and as vending lever 91 pivots in a counterclockwise direction, as viewed in FIG. 3, pawl 93 pivots in a clockwise direction about pin 95. If the purchaser stops the pivotal movement of vending lever 91 prior to its complete stroke, the pawl point 96 lodges in one of the notches 97 and thus holds the vending lever stationary. It remains in such position until the purchaser completes the full stroke of the lever 91 whereupon the point 96 can escape into the recess 99 and thereupon spring 94 brings the point 96 straight out. Return of lever 91 after point 96 has once cleared recess 99 permits pawl 93 to turn in a counterclockwise direction which prevents point 96 from lodging in notches 97 and hence permits the vending lever 91 to return to its initial position.

Likewise pivoted about shaft 22 is a driver 101. Driver 101 is a substantially flat member which has an inwardly bent portion 102 which is contacted by vending lever 91 so that as the vending lever 91 is depressed the driver 101 turns in a counterclockwise direction, as viewed in FIG. 3. Driver 101 is formed with a long downwardly extending leg 103, the lower end of which fits into a slot 104 in connector 106. Connector 106 is biased to the left, as viewed in FIG. 3 by spring 107. Connector 106 is also connected to ear 108 on first slide 61 which projects out through an elongated slot 109 in right-hand side piece 14. Hence, movement of vending lever 91 results in movement of driver 101 and in turn moves slide 61 upwardly. Parenthetically, it may be noted that as the vending lever 91 completes its stroke projection 102 contacts spring 46 which in turn pushes square cam 47 in a counterclockwise direction, as viewed in FIG. 3, and turns the spindle 23 slightly so as to push one of the cylinders 11 being vended toward the bottom or vending opening 28 in casing 26. The latter feature of the invention is effective to insure vending of a cylinder 11 particularly when there are cavitation voids in the compartments.

The second slide 62 is formed with an outwardly projecting ear 111 extending through an elongated slot 112 in left-hand side piece 14 and is biased in downward direction by spring 113 engaging ear 111. Ear 111 also engages hook 114 on one end of link 116. The other end of link 116 is fastened to the outer end of crank arm 117 which is fixed to transverse shaft 118 located immediately below the bottom or vending opening 28 in casing 26 and journaled between side pieces 14. Shaft 118 has fixed for rotation therewith a plurality of disks 119 which are formed with aligned notches 121, each notch 121 being shaped to accommodate the cross-section of one of the cylinders 11 being vended by the machine. In the relaxed position of the machine (slide 62 down), notches 121 are turned away from opening 28 as shown in full lines in FIG. 4. Each upward stroke of second slide 62 causes an approximately 90° clockwise movement of shaft 118 and disks 119, as viewed in FIG. 4. During this turning movement the notches 121 in the disks come into registry with opening 28 to receive one of the cylinders 11 in the compartment which is then in vending position. Upon downward movement of slide 62, disks 119 turn in a counterclockwise direction, as viewed in FIG. 4, and this turns the cylinder 11 held in the notches 121 around until it drops on to the top surface of plate 54 and rolls out of the vending opening 19 in the front end of the machine. By reason of the force of spring 113, the return or discharge movement of disks 119 is sufficent to dislodge any capsule that would tend to stick in the notches 121. Disks 119 are formed with flats 122 to provide clearance for blades 24 when spindle 23 is turned.

Thus, in operation, the purchaser depresses the left-hand or selector lever 31 until spindle 23 indexes in 90° steps around to position to vend the particular brand selected. Prior to deposit of a coin, in slot 17, depressing vending lever 91 causes upward movement of first slide 61 but does not cause any movement of second slide 62 and, hence, prevents discharge of merchandise. When a coin is passed through the slug rejector 51 and falls into the position indicated by reference numeral 63, depressing lever 91 causes a counterclockwise movement of driver 101 and lifts first slide 61. The position of the coin causes simultaneous lifting of second slide 62 and this is transmitted through link 116 to cause rotation of disks 119 to capture one cylinder 11 in the notches 121. Release of vending lever 91 and return of slide 62 causes return of the disks 119 to their initial position and this releases the cylinder 11 held in the notches 121 and drops the same out through opening 19.

Although the foregoing invention has been described in some detail, by way of illustration and example for purposes of clarity of understanding, it is understood that certain changes and modifications may be practiced within the spirit of the invention and scope of the appended claims.

I claim:

1. In a vending machine for regularly shaped, substantially cylindrical items of mercahndise, means forming a rotatable drum, means supporting said drum for rotation about a horizontal axis, means forming a plurarlity of compartments within said drum for holding said cylindrical items with their axes horizontal and parallel to the axis of said drum, each said compartment being dimensioned to hold loosely a plurality of said items, a casing at least partially enclosing said drum and formed with an opening through which one of said items may be discharged from said drum, said opening being at least as long as the axis of one of said items, manually operable means for indexing said drum to bring said compartments serially into juxtaposition with said opening, rotatable means located adjacent said opening and formed with a recess shaped to receive a single said item, and means operable to rotate said rotatable means first to recive a single said item in said recess deposited from said opening, then to carry said item around in said recess as said rotatable means rotates, and then to discharge said item from said recess; said rotatable means, said casing and said opening being dimensioned and positioned to discharge through said opening into said recess a single said item at a time upon each rotation of said rotatable means, said rotatable means blocking off discharge of said items through said opening when said recess is rotated away from said opening.

2. A vending machine according to claim 1 in which said rotatable means comprises a shaft and a plurality of disks notched on their peripheries and rotated by said shaft.

3. A vending machine according to claim 1 in which said means operable to rotate said rotatable means comprises to crank connected to said rotatable means and means for imparting an oscillatory motion to said crank.

4. A vending machine according to claim 1, which further comprises a cam on said drum having a number of dwells corresponding to the number of said compartments, and resilient means bearing against said cam, said means operable to rotate said rotat able means contacting said resilient means to impart a slight rotative movement to said drum to dislodge items of merchandise through said opening and drive said items into one said recess.

5. In avending machine for items of merchandise, a substantially cylindrical casing, a shaft extending transversely horizontally of said casing and substantially coaxial therewith, means mounting a plurality of blades extending outward from said shaft, said casing surrounding said blades, said blades dividing said casing into a plurality of compartments each receiving a different variety of merchandise, each said compartment being dimensioned to hold loosely a plurality of said items, a ratchet wheel rotatable with said shaft, a manually-actuated selector lever pivotally mounted in said machine for movement in a vertical plane, a pawl on said selector lever engageable with said ratchet wheel to index said shaft in angular increments upon manual movement of said selector lever, said casing at its bottom being formed with a discharge opening for discharge of said item from one of said compartments, discharge means located adjacent said opening controlling discharge of items through said opening, and manually-actuated means for actuating said discharge means, said discharge means, said casing and said opening being dimensioned and positioned to discharge through said opening a single said item upon each actuation of said discharge means, said discharge means blocking off discharge through said opening of more than one said item on each actuation of said discharge means.

6. A vending machine according to claim 5 which further comprises a cam on said shaft having a plurality of dwells corresponding to the number of said compartments, and spring means engageable with one of said dwells at a time to bias said shaft so that one of said blades is at all times positioned immediately behind said opening.

7. A vending machine according to claim 6 in which said manually-actuated means is positioned to cause a slight rotative movement of said shaft to jar said blades immediately prior to actuation of said discharge means, whereby items in the compartment adjacent said opening are jarred to move toward said opening.

References Cited in the file of this patent

UNITED STATES PATENTS

| | | |
|---|---|---|
| 368,869 | Bingham | Aug. 23, 1887 |
| 548,283 | Arthur | Oct. 22, 1895 |
| 579,330 | Peterson | Mar. 23, 1897 |
| 600,697 | Schmidt | Mar. 15, 1898 |
| 674,601 | Cody | May 21, 1901 |
| 976,089 | McAneny | Nov. 15, 1910 |
| 979,833 | Downey | Dec. 27, 1910 |
| 1,072,905 | Bowers | Sept. 9, 1913 |
| 1,184,596 | Walker | May 23, 1916 |
| 1,605,516 | Cutler | Nov. 2, 1926 |
| 1,691,998 | Smith | Nov. 20, 1928 |
| 1,975,540 | Folger | Oct. 2, 1934 |
| 2,119,063 | Wagner | May 31, 1938 |